(12) United States Patent
Zheng et al.

(10) Patent No.: US 11,703,377 B2
(45) Date of Patent: Jul. 18, 2023

(54) HEAT-SOUND-VIBRATION THREE-PARAMETER INTEGRATED IN-SITU SENSOR AND SYSTEM OF HIGH-TEMPERATURE-RESISTANT AND HIGH-PRESSURE-RESISTANT STRUCTURE

(71) Applicant: North University of China, Taiyuan (CN)

(72) Inventors: Yongqiu Zheng, Taiyuan (CN); Chenyang Xue, Taiyuan (CN); Jinge Guan, Taiyuan (CN); Pinggang Jia, Taiyuan (CN); Xinyu Zhao, Taiyuan (CN); Chen Chen, Taiyuan (CN); Jiamin Chen, Taiyuan (CN); Liyun Wu, Taiyuan (CN); Yuan Han, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 17/667,760

(22) Filed: Feb. 9, 2022

(65) Prior Publication Data
US 2022/0299359 A1 Sep. 22, 2022

(30) Foreign Application Priority Data
Feb. 9, 2021 (CN) .......................... 202110173827.2

(51) Int. Cl.
*G01H 17/00* (2006.01)
(52) U.S. Cl.
CPC .................................. *G01H 17/00* (2013.01)

(58) Field of Classification Search
None
See application file for complete search history.

(56) References Cited

U.S. PATENT DOCUMENTS

2012/0085173 A1* 4/2012 Papadopoulos ...... G01N 29/075
73/598

\* cited by examiner

*Primary Examiner* — Raul J Rios Russo
*Assistant Examiner* — Carl F. R. Tchatchouang
(74) *Attorney, Agent, or Firm* — Hauptman Ham, LLP (57) ABSTRACT

The present disclosure relates to a thermal-acoustic-vibration three-parameter integrated in-situ sensor and system with a high-temperature-resistant and high-pressure-resistant structure. The provided thermal-acoustic-vibration three-parameter integrated in-situ sensor with a high-temperature-resistant and high-pressure-resistant structure comprises a heat detection device, a sound detection device and a vibration detection device; and the sound detection device and the vibration detection device are distributed on two sides of the heat detection device. When heat, sound and vibration need to be detected, only spectra of light signals emitted by the heat detection device, the sound detection device and the vibration detection device need to be obtained, and heat information, sound information and vibration information to be detected are obtained through the corresponding relation between the spectra of the optical signals emitted by the heat detection device, the sound detection device and the vibration detection device and heat information, sound information and vibration information to be detected.

20 Claims, 5 Drawing Sheets

HEAT-SOUND-VIBRATION THREE-PARAMETER INTEGRATED IN-SITU SENSOR AND SYSTEM OF HIGH-TEMPERATURE-RESISTANT AND HIGH-PRESSURE-RESISTANT STRUCTURE

CROSS REFERENCE TO RELATED APPLICATION

This patent application claims the benefit and priority of Chinese Patent Application No. 202110173827.2 filed on Feb. 9, 2021, the disclosure of which is incorporated by reference herein in its entirety as part of the present application.

TECHNICAL FIELD

The present disclosure relates to the field of sensors, and specifically relates to a thermal-acoustic-vibration three-parameter integrated in-situ sensor and system with a high-temperature-resistant and high-pressure-resistant structure.

BACKGROUND ART

In the fields of solid rocket engines, aerospace liquid rocket engines, aero-engines, oil exploitation, nuclear energy development and the like, the working process is accompanied by extreme and complex environments such as high temperature and high pressure, internal working parts work under the severe and complex conditions and are inevitably influenced by various factors such as heat, sound and vibration, and then the working stability of the equipment is greatly influenced. Under the comprehensive action of various factors, great destruction is even caused, so that the equipment cannot work normally or explodes and disassembles. In conclusion, the in-situ synchronous test of three parameters of heat, sound and vibration is realized, and the in-situ synchronous test is of great significance for the law mastering of internal energy conversion in the working process and the design and protection of a mechanical structure.

At present, researchers have more researches in the field of high-temperature single-parameter and high-pressure single-parameter testing, but no feasible means exists in the aspect of multi-parameter synchronous testing under high-temperature and high-pressure extreme environments and complex conditions. For example, when a traditional silicon-based sensing device is at a high temperature (greater than 125° C.), the device structure of the traditional silicon-based sensing device loses efficacy, some sensing devices (such as piezoelectric, piezoresistive and resistive devices) made of various high-temperature-resistant materials are difficult to survive in a high-temperature environment exceeding 600° C., the reliable working temperature of the sensing device based on the quartz fiber is 1100° C., the grating device based on sapphire can only test the high temperature of 1600° C., and other parameter tests at the high temperature lack a reliable sensing structure. In addition, some high-temperature-resistant sensing devices are only limited to testing of a single parameter (such as pressure), due to a packaging structure, the whole sensor is large in size and not suitable for being used in a narrow space or an environment where testing cannot be affected by the sensing devices, and space synchronous testing cannot be achieved by adopting a plurality of sensors to measure different parameters.

Therefore, a device capable of accurately and stably measuring heat, sound and vibration under high-temperature and high-pressure environments is needed.

SUMMARY

Aiming at the defects in the prior art, the present disclosure provides a thermal-acoustic-vibration three-parameter integrated in-situ sensor and system with a high-temperature-resistant and high-pressure-resistant structure, so that the problem that a device capable of accurately and stably measuring thermal, acoustic and vibration parameters in a high-temperature and high-pressure environment is needed in the prior art is solved.

To achieve the above purpose, the following technical schemes are used in the embodiments of the present disclosure.

In the first aspect, the present disclosure provides a thermal-acoustic-vibration three-parameter integrated in-situ sensor with a high-temperature-resistant and high-pressure-resistant structure. The sensor comprises a heat detection device, a sound detection device and a vibration detection device; the sound detection device and the vibration detection device are distributed on two sides of the heat detection device; the sound detection device comprises a main body structure, a first volume grating, a second volume grating and a first optical fiber, a hole is formed in the interior of the main body structure, the hole is a cuboid, the first volume grating and the second volume grating are arranged on two opposite surfaces of the cuboid hole respectively, the first optical fiber is arranged outside the main body structure and close to the first volume grating; the heat detection device is a second optical fiber, a Bragg grating is arranged inside the second optical fiber, and the Bragg grating is perpendicular to the optical axis of the second optical fiber; and the vibration detection device comprises a third volume grating, a fourth volume grating, a cavity structure, a third optical fiber and a vibrating membrane, the cavity structure is a hollow cavity structure, the cavity structure is made of a semi-reflecting and semi-transparent material, the third volume grating and the fourth volume grating are arranged on two opposite surfaces inside the hollow cavity of the cavity structure respectively, the vibrating membrane is arranged inside the cavity structure and perpendicular to a connecting line of the third volume grating and the fourth volume grating, a light hole is formed in the center of the vibrating membrane, and the third optical fiber is arranged outside the cavity structure and close to the third volume grating.

Optionally, the heat detection device, the sound detection device and the vibration detection device are all made of sapphire materials.

Optionally, reflecting films arranged on the two surfaces, where the third volume grating and the fourth volume grating are arranged, of the hollow cavity are high reflecting films, and the high reflecting films are made of high reflecting materials.

Optionally, the first volume grating and the second volume grating are both high-reflector volume gratings.

Optionally, the vibrating membrane is made of an elastic material.

Optionally, the shape of the hollow cavity structure of the cavity structure is a cuboid structure.

Optionally, the vibration detection device further comprises a second vibrating membrane, a second light hole is formed in the center of the second vibrating membrane, and the second light hole is formed in the interior of the cavity structure and parallel to the vibrating membrane.

Optionally, the second vibrating membrane is made of an elastic material.

In the second aspect, the present disclosure provides a thermal-acoustic-vibration three-parameter integrated in-situ sensor system with a high-temperature-resistant and high-pressure-resistant structure. The system comprises a light source, a first spectrograph, a second spectrograph, a third spectrograph, a computer and the thermal-acoustic-vibration three-parameter integrated in-situ sensor with a high-temperature-resistant and high-pressure-resistant structure according to any one in the first aspect, the light source is arranged at one end of a first optical fiber, one end of a second optical fiber and one end of a third optical fiber and used for providing optical signals for the first optical fiber, the second optical fiber and the third optical fiber respectively, the first spectrograph is arranged at the optical signal output end of the sound detection device and used for acquiring a spectrum of optical signals emitted by the sound detection device, the second spectrograph is arranged at the optical signal output end of the heat detection device and used for acquiring a spectrum of optical signals emitted by the heat detection device, the third spectrograph is arranged at the optical signal output end of the vibration detection device and used for acquiring a spectrum of optical signals emitted by the vibration detection device, the computer is in communication connection with the first spectrograph, the second spectrograph and the third spectrograph respectively and used for obtaining the sound and/or temperature and/or vibration to be detected according to the corresponding relation between the spectra of the emitted optical signals and the sound and/or temperature and/or vibration to be detected.

The present disclosure has the following beneficial effects:

The thermal-acoustic-vibration three-parameter integrated in-situ sensor with a high-temperature-resistant and high-pressure-resistant structure provided by the present disclosure comprises a heat detection device, a sound detection device and a vibration detection device; the sound detection device and the vibration detection device are distributed on two sides of the heat detection device; the sound detection device comprises a main body structure, a first volume grating, a second volume grating and a first optical fiber, a hole is formed in the interior of the main body structure, the hole is a cuboid, the first volume grating and the second volume grating are arranged on two opposite surfaces of the cuboid hole respectively, the first optical fiber is arranged outside the main body structure and close to the first volume grating; the heat detection device is a second optical fiber, a Bragg grating is arranged inside the second optical fiber, and the Bragg grating is perpendicular to the optical axis of the second optical fiber; and the vibration detection device comprises a third volume grating, a fourth volume grating, a cavity structure, a third optical fiber and a vibrating membrane, the cavity structure is a hollow cavity structure, the cavity structure is made of a semi-reflecting and semi-transparent material, the third volume grating and the fourth volume grating are arranged on two opposite surfaces inside the hollow cavity of the cavity structure respectively, the vibrating membrane is arranged inside the cavity structure and perpendicular to a connecting line of the third volume grating and the fourth volume grating, a light hole is formed in the center of the vibrating membrane, and the third optical fiber is arranged outside the cavity structure and close to the third volume grating. When heat, sound and vibration need to be detected, only spectra of light signals emitted by the heat detection device, the sound detection device and the vibration detection device need to be obtained, and heat information, sound information and vibration information to be detected are obtained through the corresponding relation between the spectra of the optical signals emitted by the heat detection device, the sound detection device and the vibration detection device and heat information, sound information and vibration information to be detected.

BRIEF DESCRIPTION OF THE DRAWINGS

To describe the technical schemes in the embodiments of the present discourse more clearly, the following briefly describes the attached figures required for describing the embodiments. Apparently, the attached figures in the following descriptions show merely some embodiments of the present disclosure, and thus should not to be regarded as limitation of the scope; and a person of ordinary skill in the art may derive other attached figures from these attached figures without creative efforts.

Reference signs: 1, sound detection device; 2, heat detection device; 3, vibration detection device; 4, first optical fiber; 5, main body structure; 6, first volume grating; 7, hole; 8, second volume grating; 9, second optical fiber; 10, Bragg grating; 11, third optical fiber; 12, cavity structure; 13, third volume grating; 14, fourth volume grating; 15, vibrating membrane; and 16, light hole.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the attached figures in the embodiments of the present disclosure. Apparently, the described embodiments are some but not all of the embodiments of the present disclosure. Generally, the described and illustrated components of the embodiments of the present disclosure in the attached figures can be arranged and designed through various different configurations.

Therefore, the detailed description of the embodiments of the present disclosure provided in the attached figures is not intended to restrict the protected scope of the present disclosure, but merely represents the selected embodiment of the present disclosure. All other embodiments obtained by those skilled in the art based on the embodiments of the present disclosure without creative efforts shall fall within the protection scope of the present disclosure.

It is noted that similar labels and alphabets represent similar items in the following attached figures, and thus, once a certain item is defined in one attached figure, the item does not need to be further defined and described in the following attached figures.

In the description of the present disclosure, it needs to be illustrated that the indicative direction or position relations of the terms such as "center", "upper", "lower", "left", "right", "vertical", "horizontal", "inside" and "outside" are direction or position relations illustrated based on the accompanying diagrams, or the frequently placing direction or position relations when the product in the present disclosure is used, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first", "second" and "third" are just used for distinguishing the description, but cannot be understood to indicate or hint relative importance.

Moreover, the terms such as "horizontal" and "vertical" do not represent that the components need to be horizontal or overhang absolutely, but can be slightly inclined. For example, the term "horizontal" just indicates that the direction is relatively horizontal relative to "vertical", but does not represent that the structure must be completely horizontal and can be slightly inclined.

In the description of the present disclosure, it needs to be illustrated that, except as otherwise noted, the terms such as "arrange", "install", "link" and "connect" should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally. For those skilled in the art, the specific meanings of the terms in the present disclosure can be understood according to specific conditions.

In order to make the implementation process of the present disclosure clearer, the following detailed description is taken in conjunction with the attached figures.

Figure 1:
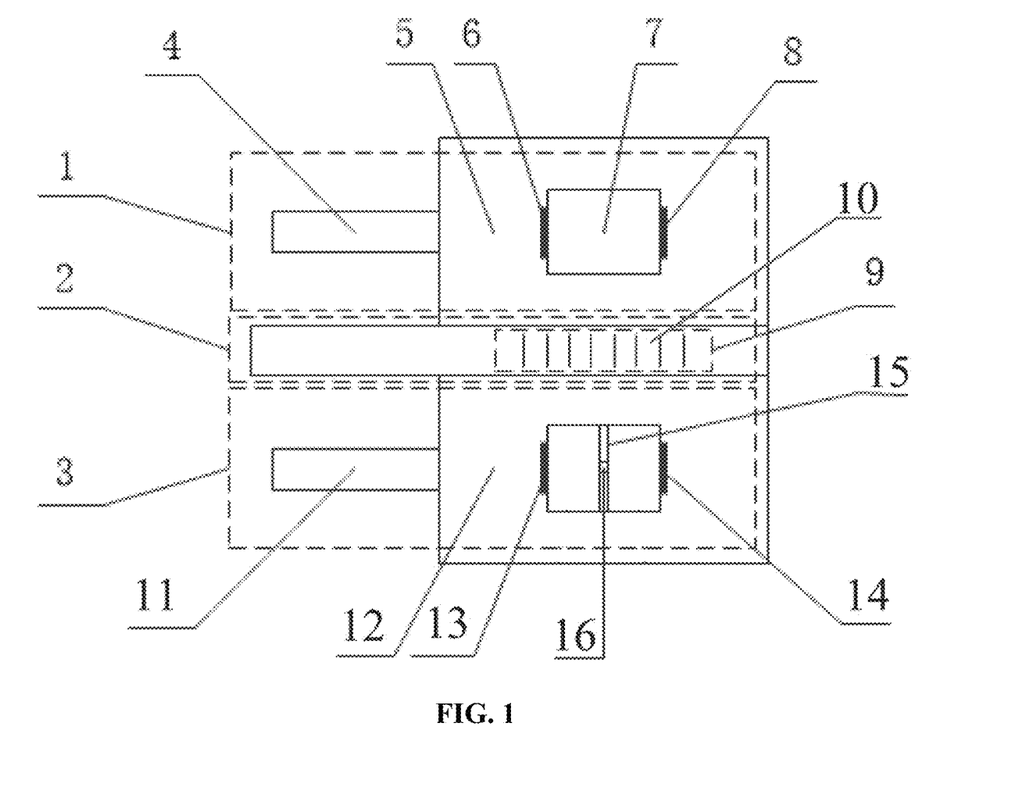
FIG. 1 is a structural schematic diagram of a thermal-acoustic-vibration three-parameter integrated in-situ sensor with a high-temperature-resistant and high-pressure-resistant structure provided by an embodiment of the present disclosure.

FIG. 1 is a structural schematic diagram of a thermal-acoustic-vibration three-parameter integrated in-situ sensor with a high-temperature-resistant and high-pressure-resistant structure provided by an embodiment of the present disclosure.

Figure 2:
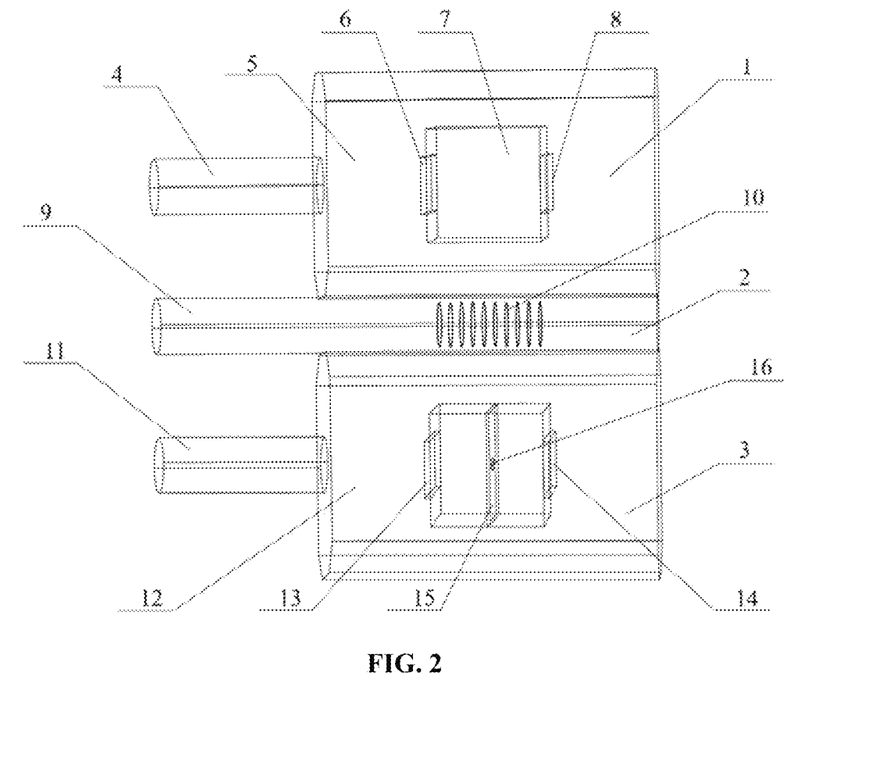
FIG. 2 is a three-dimensional schematic diagram of a thermal-acoustic-vibration three-parameter integrated in-situ sensor with a high-temperature-resistant and high-pressure-resistant structure provided by an embodiment of the present disclosure.

FIG. 2 is a three-dimensional schematic diagram of a thermal-acoustic-vibration three-parameter integrated in-situ sensor with a high-temperature-resistant and high-pressure-resistant structure provided by an embodiment of the present disclosure. As shown in FIG. 1 and FIG. 2, the present disclosure provides a thermal-acoustic-vibration three-parameter integrated in-situ sensor with a high-temperature-resistant and high-pressure-resistant structure. The sensor comprises a heat detection device 2, a sound detection device 1 and a vibration detection device 3; the sound detection device 1 and the vibration detection device 3 are distributed on two sides of the heat detection device 2; the sound detection device 1 comprises a main body structure 5, a first volume grating 6, a second volume grating 8 and a first optical fiber 4, a hole 7 is formed in the interior of the main body structure 5, the hole 7 is a cuboid, the first volume grating 6 and the second volume grating 8 are arranged on two opposite surfaces of the cuboid hole 7 respectively, the first optical fiber 4 is arranged outside the main body structure 5 and close to the first volume grating 6; the heat detection device 2 is a second optical fiber 9, a Bragg grating 10 is arranged inside the second optical fiber 2, and the Bragg grating 10 is perpendicular to the optical axis of the second optical fiber 9; and the vibration detection device 3 comprises a third volume grating 13, a fourth volume grating 14, a cavity structure 12, a third optical fiber 11 and a vibrating membrane 15, the cavity structure 12 is a hollow cavity structure, the cavity structure 12 is made of a semi-reflecting and semi-transparent material, the third volume grating 13 and the fourth volume grating 14 are arranged on two opposite surfaces inside the hollow cavity of the cavity structure 12 respectively, the vibrating membrane 15 is arranged inside the cavity structure 12 and perpendicular to a connecting line of the third volume grating 13 and the fourth volume grating 14, a light hole 16 is formed in the center of the vibrating membrane 15, and the third optical fiber 11 is arranged outside the cavity structure 12 and close to the third volume grating 13.

The thermal-acoustic-vibration three-parameter integrated in-situ sensor with a high-temperature-resistant and high-pressure-resistant structure in the present disclosure comprises a heat detection device 2, a sound detection device 1 and a vibration detection device 3; the sound detection device 1 and the vibration detection device 3 are distributed on two sides of the heat detection device 3; the sound detection device comprises a main body structure 5, a first volume grating 6, a second volume grating 8 and a first optical fiber 4, a hole 7 is formed in the interior of the main body structure 5, the hole 7 is a cuboid, the first volume grating 6 and the second volume grating 8 are arranged on two opposite surfaces of the cuboid hole 7 respectively, the first optical fiber 4 is arranged outside the main body structure 5 and close to the first volume grating 6, the specific geometric parameters of the hole 7 in the main body structure 5 are selected according to actual needs and are not specifically limited here, the first volume grating 6 and the second volume grating 8 are respectively arranged on two opposite surfaces of the main body structure 5 and used for increasing the reflectivity inside the main body structure 5, the first optical fiber 4 is arranged outside the main body structure 5 and close to the first volume grating 6, the first optical fiber 4 is used for transmitting optical signals into the hole 7 in the main body structure 5, and since the hole 7 in the main body structure 5 is equivalent to a Fabry-Perot cavity, the optical signals enter the Fabry-Perot cavity through the first optical fiber 4; the Fabry-Perot cavity is used for reflecting multiple times to form interference light, the interference light is output through the output end of the Fabry-Perot cavity, and when sound to be detected acts on the sound sensor, the Fabry-Perot cavity of the sound sensor deforms, and then a light beam interference spectral line in the Fabry-Perot cavity is changed. The light beam interference spectral line is detected, and the sound intensity to be detected is obtained through the corresponding relation between the light beam interference spectral line and the sound intensity to be detected; the heat detection device 2 is of the Bragg grating 10 structure arranged on the second optical fiber 9, the Bragg grating 10 is perpendicular to the axis of the second optical fiber 9, and due to the fact that the Bragg grating 10 structure has thermal sensitivity, the heat detection device 2 deforms under the action of heat to be detected, namely the central wavelength of light reflected by the Bragg grating 10 is changed. Through detection of the variation of the central wavelength of the light reflected by the Bragg grating 10 and the corresponding relation between the variation of the central wavelength of the light reflected by the Bragg grating 10 and the heat or temperature to be detected, the heat or temperature to be detected is obtained; the vibration detection device 3 comprises a third volume grating 13, a fourth volume grating 14, a cavity structure 12, a third optical fiber 11 and a vibrating membrane 15, the cavity structure 12 is generally of a cuboid structure, the third volume grating 13 and the fourth volume grating 14 are arranged on two sides of the interior of the cavity structure 12 of a cuboid structure respectively, the vibrating membrane 15 is arranged at the central position of the interior of the cavity structure 12, the vibrating membrane 15 is perpendicular to a connecting line of the third volume grating 13 and the fourth volume grating 14, a light hole 16 is formed in the center of the vibrating membrane 15, the third optical fiber 11 is arranged outside the cavity structure 12 and close to the third volume grating 13, the optical signals enter into the interior of the cavity through the input end of the third optical fiber 11, the optical signals are reflected for multiple times in the cavity, the optical signals form Gaussian light in the Fabry-Perot cavity through the light hole 16 in the vibrating membrane 15, that is, the optical signals completely pass through the light hole 16, the light transmission amount is detected light at the emitting end of a vibrating sensor, and when vibration needs to be detected, the vibrating sensor is arranged on a plane to be detected, so that a to-be-measured platform vibrates to enable the vibrating sensor to resonate, then the position of the vibrating membrane 15 is changed, the light transmission amount of light at the emitting end of the vibrating sensor is changed, the change of the light transmission amount in the cavity structure 12 is obtained through calculation, and vibration information is obtained according to the corresponding relation between the change of the light transmission amount and the vibration information. The vibration information can be the level of the vibration and can also be the energy parameter of the vibration without specific limitation, and the vibration information is obtained according to the corresponding relation between the spectrum of the emergent optical signals and the sound and/or temperature and/or vibration to be detected and experimental measurement without specific limitation.

Figure 3:
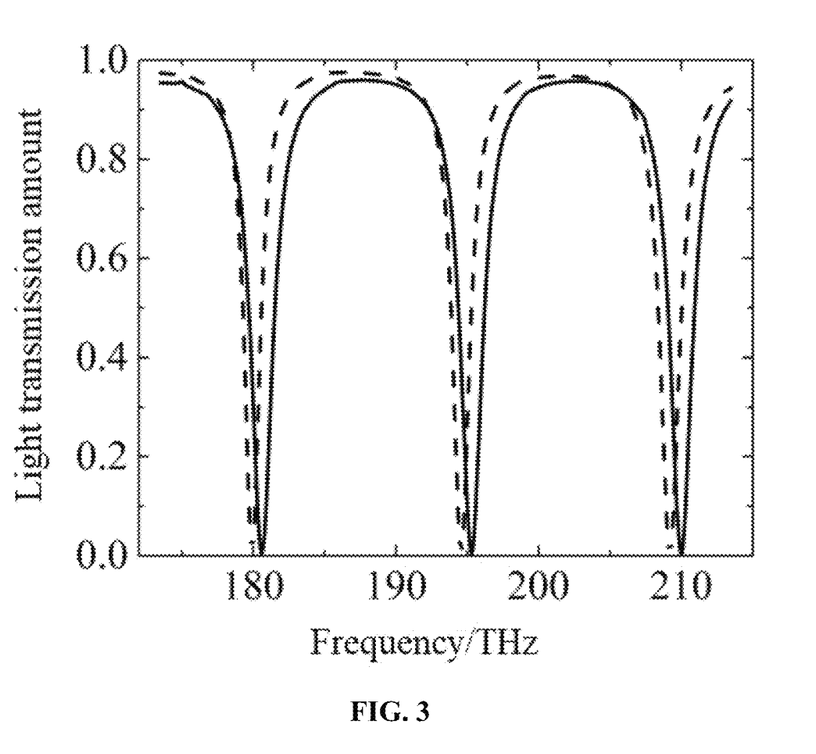
FIG. 3 is a sound detection device received sound signal spectral line drift diagram of a thermal-acoustic-vibration three-parameter integrated in-situ sensor with a high-temperature-resistant and high-pressure-resistant structure provided by an embodiment of the present disclosure.
Figure 4:
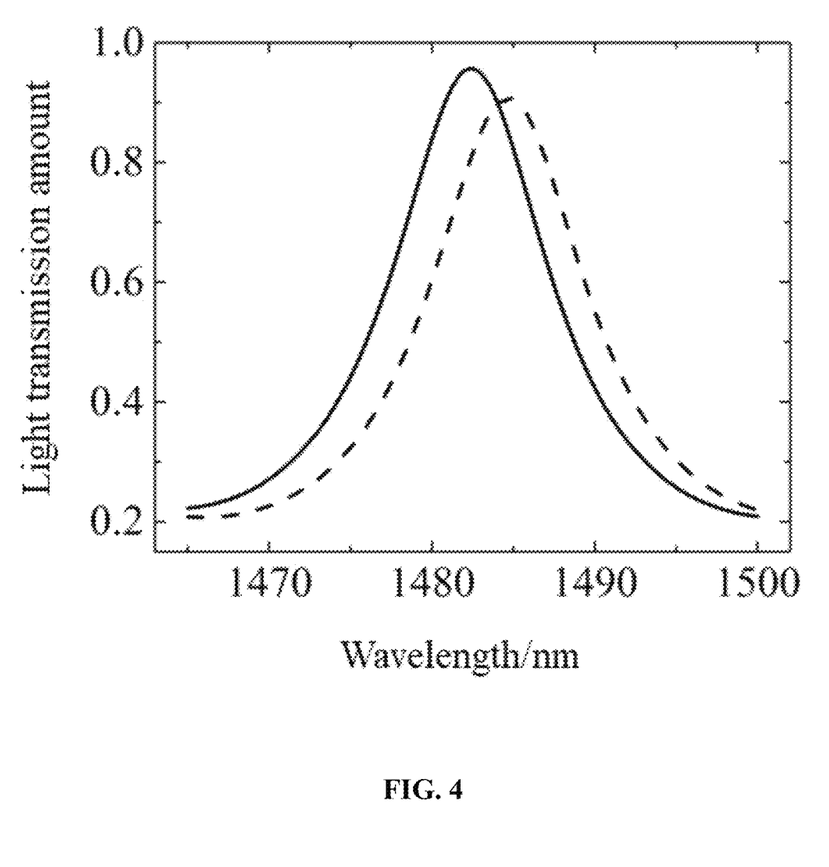
FIG. 4 is a Bragg grating central wavelength change diagram of a heat detection device of a thermal-acoustic-vibration three-parameter integrated in-situ sensor with a high-temperature-resistant and high-pressure-resistant structure provided by an embodiment of the present disclosure.
Figure 5:
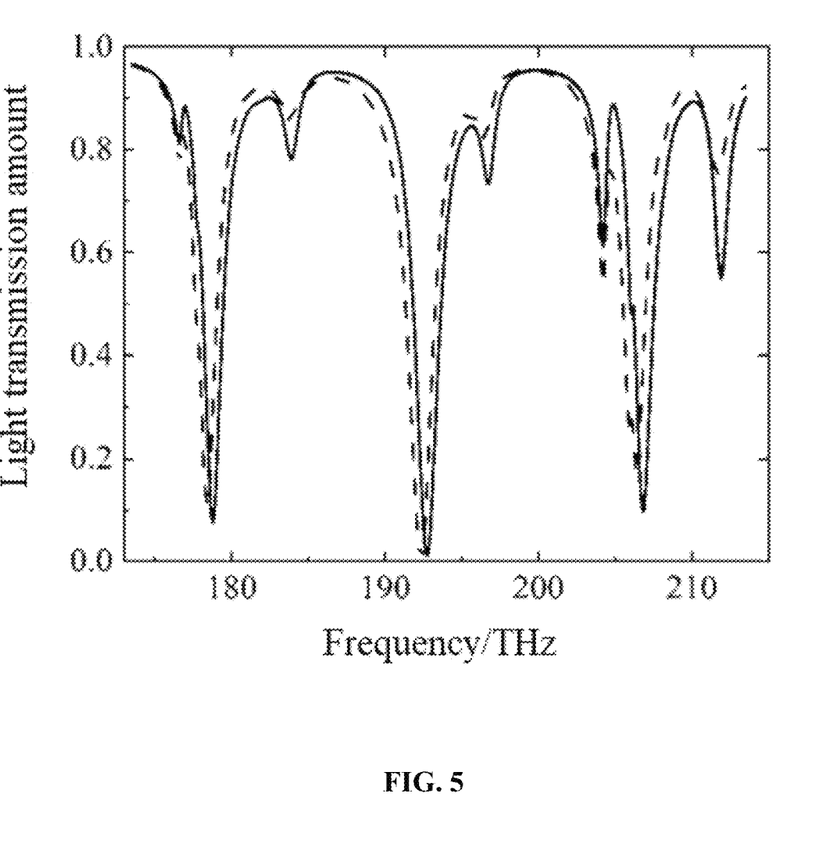
FIG. 5 is a vibration detection device received vibration signal spectral line drift diagram of a thermal-acoustic-vibration three-parameter integrated in-situ sensor with a high-temperature-resistant and high-pressure-resistant structure provided by an embodiment of the present disclosure.

FIG. 3 is a sound detection device received sound signal spectral line drift diagram of a thermal-acoustic-vibration three-parameter integrated in-situ sensor with a high-temperature-resistant and high-pressure-resistant structure provided by an embodiment of the present disclosure; FIG. 4 is a Bragg grating central wavelength change diagram of a heat detection device of a thermal-acoustic-vibration three-parameter integrated in-situ sensor with a high-temperature-resistant and high-pressure-resistant structure provided by an embodiment of the present disclosure; FIG. 5 is a vibration detection device received vibration signal spectral line drift diagram of a thermal-acoustic-vibration three-parameter integrated in-situ sensor with a high-temperature-resistant and high-pressure-resistant structure provided by an embodiment of the present disclosure; as shown in FIG. 3, FIG. 4 and FIG. 5, in FIG. 3, the horizontal ordinate is frequency, and the vertical coordinate is light transmission quantity; in FIG. 4, the horizontal ordinate is wavelength, and the vertical coordinate is light transmission quantity; in FIG. 4, the horizontal coordinate is frequency, the vertical coordinate is light transmission quantity, and after information to be measured is measured, the heat detection device 2, the sound detection device 1 and the vibration detection device 3 deform through the FIG. 3, FIG. 4 and FIG. 5, so that the light transmission quantity is increased, and the frequency and the wavelength are shifted leftwards.

The working principle of the thermal-acoustic-vibration three-parameter integrated in-situ sensor with a high-temperature-resistant and high-pressure-resistant structure is as follows:

Firstly, the sensor is composed of a heat detection device 2, a sound detection device 1 and a vibration detection device 3, the whole sensor is of an integrated structure, and all the parts are only sensitive to specific physical quantities. The heat detection device 2 is a Bragg grating 10, light is input from one end of the second optical fiber 9, most of the light is reflected at the Bragg grating 10, a small part of the light is transmitted and output from the other end of the second optical fiber 9, and when the temperature changes, the central wavelength of the light reflected by the Bragg grating 10 changes to sense the temperature. In the process, large bandwidth and high reflection spectra are realized through the Bragg grating 10, and sensing detection in a high-temperature environment is realized. Secondly, the sound detection device 1 forms a Fabry-Perot cavity structure. Wherein light is input from one end of the first optical fiber 4 and then enters the Fabry-Perot cavity, resonance occurs in the air of the Fabry-Perot cavity, and the resonance frequency of the Fabry-Perot cavity is obtained by detecting reflected light or transmitted light. When sound wave signals exist outside, the sound wave signals compress air in the center of the Fabry-Perot cavity to cause the change of the refractive index of the air, so that the propagation of resonant light beams in the Fabry-Perot cavity is influenced, and finally, the resonant frequency of the Fabry-Perot cavity drifts to detect the sound signals. The volume grating is used for enhancing the reflection of light at the interface of the main body structure 5 and the air, thus improving the fineness of the Fabry-Perot cavity and increasing the sensitivity of sound detection. Thirdly, according to the Fabry-Perot cavity structure of the vibration detection device 3, air passes through the light hole 16 in the center of the vibrating membrane 15. In the structure, the vibrating membrane 15 is used for generating displacement of a sensitive vibration signal, and a diaphragm can limit the transmission of the resonant light beams of the Fabry-Perot cavity, so that the drift of the resonant frequency of the Fabry-Perot cavity is caused.

The present disclosure creatively provides a thermal-acoustic-vibration three-parameter integrated in-situ sensor with a high-temperature-resistant and high-pressure-resistant structure, synchronous measurement of temperature, sound and vibration signals is carried out through a structure comprising a heat detection device 2, a sound detection device 1 and a vibration detection device 3, and the sensor is an innovation in the field of thermal-acoustic-vibration measurement. The sensor is not only limited to a high-temperature and high-pressure environment, but also has applicability in other temperature and pressure environments such as normal temperature and normal pressure.

Optionally, the heat detection device 2, the sound detection device 1 and the vibration detection device 3 are all made of sapphire materials.

The heat detection device 2, the sound detection device 1 and the vibration detection device 3 are made of sapphire materials, so that a sapphire-air-sapphire Fabry-Perot cavity structure is formed in each of the sound detection device 1 and the vibration detection device 3, and detection of heat, sound and vibration is more accurate. In addition, firstly, the thermal-acoustic-vibration three-parameter integrated in-situ sensor of the high-temperature-resistant and high-pressure-resistant structure is completely made of sapphire single crystals and is of a sapphire homogeneous material integrated structure, high-temperature stress mismatch can be eliminated, and high-reliability work of the sensor under the high-temperature condition is guaranteed; secondly, the heat detection device 2 is a Bragg grating 10 on a solid sapphire crystal, the noise sensing structure is of an open Fabry-Perot structure, the vibration sensing structure is of an open Fabry structure, a sealed cavity structure does not exist, and high-reliability work of the sensor under a high-pressure condition is guaranteed; thirdly, the Fabry-Perot structure based on the sound detection device 1 and the vibration detection device 3 adopts femtosecond laser layer-by-layer scanning, and a high-reflector grating is processed on the inner wall of the Fabry-Perot structure to replace a traditional high-reflectivity dielectric film or metal film, so that high reflectivity of light in a high-temperature environment is ensured; and fourthly, the sensing structures of the thermal-acoustic-vibration three-parameter integrated in-situ sensor with a high-temperature-resistant and high-pressure-resistant structure are mutually independent, so that the problem of three-parameter cross coupling can be avoided; meanwhile, the three-parameter integrated structure is small in size, and thermal-acoustic-vibration space-time synchronous in-situ measurement can be achieved.

Optionally, reflecting films arranged on the two surfaces, where the third volume grating 13 and the fourth volume grating 14 are arranged, of the hollow cavity are high reflecting films, and the high reflecting films are made of high reflecting materials.

The high reflecting films are made of a high reflecting material, the high reflecting films made of the high reflecting material is used for further increasing reflection of light of the Fabry-Perot cavity, and the vibration detection accuracy is improved by reducing loss of optical signals.

Optionally, the first volume grating 6 and the second volume grating 8 are both high-reflector volume gratings.

Optionally, the second vibrating membrane 15 is made of an elastic material.

The vibrating membrane 15 is made of an elastic material, and the vibrating membrane 15 made of the elastic material deforms under the action of external force to vibrate and can restore to the original state when the external force disappears.

Optionally, the shape of the hollow cavity structure of the cavity structure 12 is a cuboid structure.

Optionally, the vibration detection device 3 further comprises a second vibrating membrane 15, a second light hole is formed in the center of the second vibrating membrane 15, and the second light hole is formed in the interior of the cavity structure 12 and parallel to the vibrating membrane 15.

The optical signals passing through the light hole 16 of the vibrating membrane 15, at the light hole 16 of the second vibrating membrane 15, vibration detection is more sensitive and higher in accuracy, the materials and other parameters of the vibrating membrane 15 and the second vibrating membrane 15 are the same, the shape and the radius of the second light hole are selected according to actual needs, and no specific limitation is made herein.

Optionally, the second vibrating membrane 15 is made of an elastic material.

The thermal-acoustic-vibration three-parameter integrated in-situ sensor with a high-temperature-resistant and high-pressure-resistant structure provided by the present disclosure comprises a heat detection device 1, a sound detection device 1 and a vibration detection device 3; the sound detection device 1 and the vibration detection device 3 are distributed on two sides of the heat detection device 2; the sound detection device 1 comprises a main body structure 5, a first volume grating 6, a second volume grating 8 and a first optical fiber 4, a hole 7 is formed in the interior of the main body structure 5, the hole 7 is a cuboid, the first volume grating 6 and the second volume grating 8 are arranged on two opposite surfaces of the cuboid hole 7 respectively, the first optical fiber 4 is arranged outside the main body structure 5 and close to the first volume grating 6; the heat detection device 2 is a second optical fiber 9, a Bragg grating 10 is arranged inside the second optical fiber 9, and the Bragg grating 10 is perpendicular to the optical axis of the second optical fiber 9; and the vibration detection device 3 comprises a third volume grating 13, a fourth volume grating 14, a cavity structure 12, a third optical fiber 11 and a vibrating membrane 15, the cavity structure 12 is a hollow cavity structure, the cavity structure 12 is made of a semi-reflecting and semi-transparent material, the third volume grating 13 and the fourth volume grating 14 are arranged on two opposite surfaces inside the hollow cavity of the cavity structure 12 respectively, the vibrating membrane 15 is arranged inside the cavity structure 12 and perpendicular to a connecting line of the third volume grating 13 and the fourth volume grating 14, a light hole 16 is formed in the center of the vibrating membrane 15, and the third optical fiber 11 is arranged outside the cavity structure 12 and close to the third volume grating 13. When heat, sound and vibration need to be detected, only spectra of light signals emitted by the heat detection device 2, the sound detection device 1 and the vibration detection device 3 need to be obtained, and heat information, sound information and vibration information to be detected are obtained through the corresponding relation between the spectra of the optical signals emitted by the heat detection device 2, the sound detection device 1 and the vibration detection device 3 and heat information, sound information and vibration information to be detected.

The present disclosure provides a thermal-acoustic-vibration three-parameter integrated in-situ sensor system with a high-temperature-resistant and high-pressure-resistant structure. The system comprises a light source, a first spectrograph, a second spectrograph, a third spectrograph, a computer and the thermal-acoustic-vibration three-parameter integrated in-situ sensor with a high-temperature-resistant and high-pressure-resistant structure according to any one, the light source is arranged at one end of a first optical fiber 4, one end of a second optical fiber 9 and one end of a third optical fiber 11 and used for providing optical signals for the first optical fiber 4, the second optical fiber 9 and the third optical fiber 11 respectively, the first spectrograph is arranged at the optical signal output end of the sound detection device 1 and used for acquiring a spectrum of optical signals emitted by the sound detection device 1, the second spectrograph is arranged at the optical signal output end of the heat detection device 2 and used for acquiring a spectrum of optical signals emitted by the heat detection device 2, the third spectrograph is arranged at the optical signal output end of the vibration detection device 3 and used for acquiring a spectrum of optical signals emitted by the vibration detection device 3, the computer is in communication connection with the first spectrograph, the second spectrograph and the third spectrograph respectively and used for obtaining the sound and/or temperature and/or vibration to be detected according to the corresponding relation between the spectra of the emitted optical signals and the sound and/or temperature and/or vibration to be detected.

The foregoing descriptions are merely exemplary embodiments of the present disclosure, but are not intended to limit the present disclosure, and for the skill in the art, the present disclosure can be of various modifications and changes. Any modification, equivalent replacement, or improvement made without departing from the spirit and principle of the present disclosure shall fall within the protection scope of the present disclosure.

What is claimed is:

1. A thermal-acoustic-vibration three-parameter integrated in-situ sensor with a high-temperature-resistant and high-pressure-resistant structure, wherein the sensor comprises a heat detection device, a sound detection device and a vibration detection device; the sound detection device and the vibration detection device are distributed on two sides of the heat detection device; the sound detection device comprises a main body structure, a first volume grating, a second volume grating and a first optical fiber, a hole is formed in the interior of the main body structure, the hole is a cuboid, the first volume grating and the second volume grating are arranged on two opposite surfaces of the cuboid hole respectively, the first optical fiber is arranged outside the main body structure and close to the first volume grating; the heat detection device is a second optical fiber, a Bragg grating is arranged inside the second optical fiber, and the Bragg grating is perpendicular to the optical axis of the second optical fiber; and the vibration detection device comprises a third volume grating, a fourth volume grating, a cavity structure, a third optical fiber and a vibrating membrane, the cavity structure is a hollow cavity structure, the cavity structure is made of a semi-reflecting and semi-transparent material, the third volume grating and the fourth volume grating are arranged on two opposite surfaces inside the hollow cavity of the cavity structure respectively, the vibrating membrane is arranged inside the cavity structure and perpendicular to a connecting line of the third volume grating and the fourth volume grating, a light hole is formed in the center of the vibrating membrane, and the third optical fiber is arranged outside the cavity structure and close to the third volume grating.

2. The thermal-acoustic-vibration three-parameter integrated in-situ sensor with a high-temperature-resistant and high-pressure-resistant structure according to claim 1, wherein the heat detection device, the sound detection device and the vibration detection device are all made of sapphire materials.

3. The thermal-acoustic-vibration three-parameter integrated in-situ sensor with a high-temperature-resistant and high-pressure-resistant structure according to claim 2, wherein reflecting films arranged on the two surfaces, where the third volume grating and the fourth volume grating are arranged, of the hollow cavity are high reflecting films, and the high reflecting films are made of high reflecting materials.

4. The thermal-acoustic-vibration three-parameter integrated in-situ sensor with a high-temperature-resistant and high-pressure-resistant structure according to claim 3, wherein the first volume grating and the second volume grating are both high-reflector volume gratings.

5. The thermal-acoustic-vibration three-parameter integrated in-situ sensor with a high-temperature-resistant and high-pressure-resistant structure according to claim 4, wherein the vibrating membrane is made of an elastic material.

6. The thermal-acoustic-vibration three-parameter integrated in-situ sensor with a high-temperature-resistant and high-pressure-resistant structure according to claim 5, wherein the shape of the hollow cavity structure of the cavity structure is a cuboid structure.

7. The thermal-acoustic-vibration three-parameter integrated in-situ sensor with a high-temperature-resistant and high-pressure-resistant structure according to claim 1, wherein the vibration detection device further comprises a second vibrating membrane, a second light hole is formed in the center of the second vibrating membrane, and the second light hole is formed in the interior of the cavity structure and parallel to the vibrating membrane.

8. The thermal-acoustic-vibration three-parameter integrated in-situ sensor with a high-temperature-resistant and high-pressure-resistant structure according to claim 7, wherein the second vibrating membrane is made of an elastic material.

9. The thermal-acoustic-vibration three-parameter integrated in-situ sensor with a high-temperature-resistant and high-pressure-resistant structure according to claim 7, wherein the heat detection device, the sound detection device and the vibration detection device are all made of sapphire materials.

10. The thermal-acoustic-vibration three-parameter integrated in-situ sensor with a high-temperature-resistant and high-pressure-resistant structure according to claim 9, wherein the second vibrating membrane is made of an elastic material.

11. The thermal-acoustic-vibration three-parameter integrated in-situ sensor with a high-temperature-resistant and high-pressure-resistant structure according to claim 9, wherein reflecting films arranged on the two surfaces, where the third volume grating and the fourth volume grating are arranged, of the hollow cavity are high reflecting films, and the high reflecting films are made of high reflecting materials.

12. The thermal-acoustic-vibration three-parameter integrated in-situ sensor with a high-temperature-resistant and high-pressure-resistant structure according to claim 11, wherein the first volume grating and the second volume grating are both high-reflector volume gratings.

13. The thermal-acoustic-vibration three-parameter integrated in-situ sensor with a high-temperature-resistant and high-pressure-resistant structure according to claim 11, wherein the second vibrating membrane is made of an elastic material.

14. The thermal-acoustic-vibration three-parameter integrated in-situ sensor with a high-temperature-resistant and high-pressure-resistant structure according to claim 12, wherein the vibrating membrane is made of an elastic material.

15. The thermal-acoustic-vibration three-parameter integrated in-situ sensor with a high-temperature-resistant and high-pressure-resistant structure according to claim 12, wherein the second vibrating membrane is made of an elastic material.

16. The thermal-acoustic-vibration three-parameter integrated in-situ sensor with a high-temperature-resistant and high-pressure-resistant structure according to claim 14, wherein the shape of the hollow cavity structure of the cavity structure is a cuboid structure.

17. The thermal-acoustic-vibration three-parameter integrated in-situ sensor with a high-temperature-resistant and high-pressure-resistant structure according to claim 14, wherein the second vibrating membrane is made of an elastic material.

18. The thermal-acoustic-vibration three-parameter integrated in-situ sensor with a high-temperature-resistant and high-pressure-resistant structure according to claim 16, wherein the second vibrating membrane is made of an elastic material.

19. A thermal-acoustic-vibration three-parameter integrated in-situ sensor system with a high-temperature-resistant and high-pressure-resistant structure, wherein the system comprises a light source, a first spectrograph, a second spectrograph, a third spectrograph, a computer and the thermal-acoustic-vibration three-parameter integrated in-situ sensor with a high-temperature-resistant and high-pressure-resistant structure according to claim 1, the light source is arranged at one end of a first optical fiber, one end of a second optical fiber and one end of a third optical fiber and used for providing optical signals for the first optical fiber, the second optical fiber and the third optical fiber respectively, the first spectrograph is arranged at the optical signal output end of the sound detection device and used for acquiring a spectrum of optical signals emitted by the sound detection device, the second spectrograph is arranged at the optical signal output end of the heat detection device and used for acquiring a spectrum of optical signals emitted by the heat detection device, the third spectrograph is arranged at the optical signal output end of the vibration detection device and used for acquiring a spectrum of optical signals emitted by the vibration detection device, the computer is in communication connection with the first spectrograph, the second spectrograph and the third spectrograph respectively and used for obtaining the sound and/or temperature and/or vibration to be detected according to the corresponding relation between the spectra of the emitted optical signals and the sound and/or temperature and/or vibration to be detected.

20. The system according to claim 19, wherein the heat detection device, the sound detection device and the vibration detection device are all made of sapphire materials.

* * * * *